(12) United States Patent
Watanabe et al.

(10) Patent No.: US 10,994,784 B2
(45) Date of Patent: May 4, 2021

(54) VEHICLE BODY FRONT STRUCTURE

(71) Applicant: HONDA MOTOR CO., LTD., Tokyo (JP)

(72) Inventors: Kei Watanabe, Wako (JP); Keita Ishihara, Wako (JP)

(73) Assignee: HONDA MOTOR CO. LTD., Tokyo (JP)

( * ) Notice: Subject to any disclaimer, the term of this patent is extended or adjusted under 35 U.S.C. 154(b) by 123 days.

(21) Appl. No.: 16/562,888

(22) Filed: Sep. 6, 2019

(65) Prior Publication Data

US 2020/0079432 A1 Mar. 12, 2020

(30) Foreign Application Priority Data

Sep. 11, 2018 (JP) .............................. JP2018-170005

(51) Int. Cl.
*B60R 19/34* (2006.01)
*B62D 21/15* (2006.01)
*B60K 5/12* (2006.01)
*B62D 21/02* (2006.01)

(52) U.S. Cl.
CPC .......... *B62D 21/152* (2013.01); *B60K 5/1275* (2013.01); *B60R 19/34* (2013.01); *B62D 21/02* (2013.01)

(58) Field of Classification Search
CPC ....... H01L 2924/00; H01L 2224/48247; H01L 2224/48472; H01L 2224/48091; H01L 2924/00014; H01L 2224/45144; H01L 2924/00015; H01L 2224/48463; B62D 21/152
See application file for complete search history.

(56) References Cited

U.S. PATENT DOCUMENTS

| | | | | |
|---|---|---|---|---|
| 3,815,703 A | * | 6/1974 | De Lorean | B60R 19/26 180/232 |
| 3,869,017 A | * | 3/1975 | Feustel | B62D 21/152 180/232 |
| 4,181,192 A | * | 1/1980 | Danckert | B60K 5/1275 180/232 |
| 6,736,449 B2 | * | 5/2004 | Takahashi | B62D 21/11 296/203.02 |
| RE47,286 E | * | 3/2019 | Ohnaka | B62D 25/085 |
| 2007/0187960 A1 | * | 8/2007 | Evans | B60R 19/18 293/133 |
| 2013/0241233 A1 | * | 9/2013 | Ohnaka | B62D 21/152 296/187.1 |
| 2016/0152273 A1 | | 6/2016 | Kuriyama et al. | |
| 2016/0244098 A1 | * | 8/2016 | Kanemori | B60G 3/06 |
| 2017/0096169 A1 | * | 4/2017 | Takeda | B62D 25/2018 |

(Continued)

FOREIGN PATENT DOCUMENTS

JP 2015-009712 A 1/2015

*Primary Examiner* — Kiran B Patel
(74) *Attorney, Agent, or Firm* — Rankin, Hill & Clark LLP (57) ABSTRACT

A vehicle body front structure includes a side frame and a tubular member. The side member extends in a longitudinal direction of a vehicle body. The side frame member is configured to have a closed hollow section in a vertical direction orthogonal to the longitudinal direction. The tubular member extends in the longitudinal direction within the side frame. The tubular member is configured to have a closed hollow section in the vertical direction. The tubular member is spaced apart from the side frame.

8 Claims, 7 Drawing Sheets

(56) References Cited

U.S. PATENT DOCUMENTS

| | | | |
|---|---|---|---|
| 2017/0113735 A1* | 4/2017 | Kawabe | B60R 19/34 |
| 2018/0194399 A1* | 7/2018 | Grattan | B62D 21/05 |
| 2018/0194401 A1* | 7/2018 | Grattan | B62D 21/05 |
| 2018/0244226 A1* | 8/2018 | Abe | B60R 19/023 |
| 2019/0009820 A1* | 1/2019 | Kondo | B62D 21/152 |
| 2020/0001930 A1* | 1/2020 | Morisawa | B60R 19/023 |
| 2020/0353993 A1* | 11/2020 | Yoshida | B82D 21/152 |

* cited by examiner

VEHICLE BODY FRONT STRUCTURE

CROSS-REFERENCE TO RELATED APPLICATION

This application claims the benefit of foreign priority to Japanese Patent Application No. JP2018-170005, filed Sep. 11, 2018, which is incorporated by reference in its entirety.

TECHNICAL FIELD

The present invention relates to a front structure of a vehicle body.

BACKGROUND ART

A vehicle body front structure for absorbing a load of a frontal collision is disclosed in JP2015-009712A, in which a front end portion of a front side member (frame) is formed as a crash box.

In this vehicle body front structure, there is a demand for improving the degree of flexibility in designing energy absorption performance during a frontal collision.

In view of the above, it is an object of the present invention to provide a vehicle body front structure capable of improving the degree of flexibility in designing energy absorption performance during a frontal collision.

SUMMARY

The present invention proposed to attain the above object provides a vehicle body front structure comprising: a side frame extending in a longitudinal direction of a vehicle body and configured to have a closed hollow section in a vertical direction orthogonal to the longitudinal direction; and a tubular member extending in the longitudinal direction within the side frame and configured to have a closed hollow section in the vertical direction, wherein the tubular member is spaced apart from the side frame.

DETAILED DESCRIPTION OF THE INVENTION

One embodiment of the present invention will be described in detail with reference to the drawings where necessary; in this embodiment, the present invention is applied to a structure around right and left front side frames of an automobile. Since the structure around the right front side frame is substantially the same as the structure around the left front side frame, only the right-side front side frame is shown in the drawings and the following description will be made with reference to the right-side front side frame.

Figure 1:
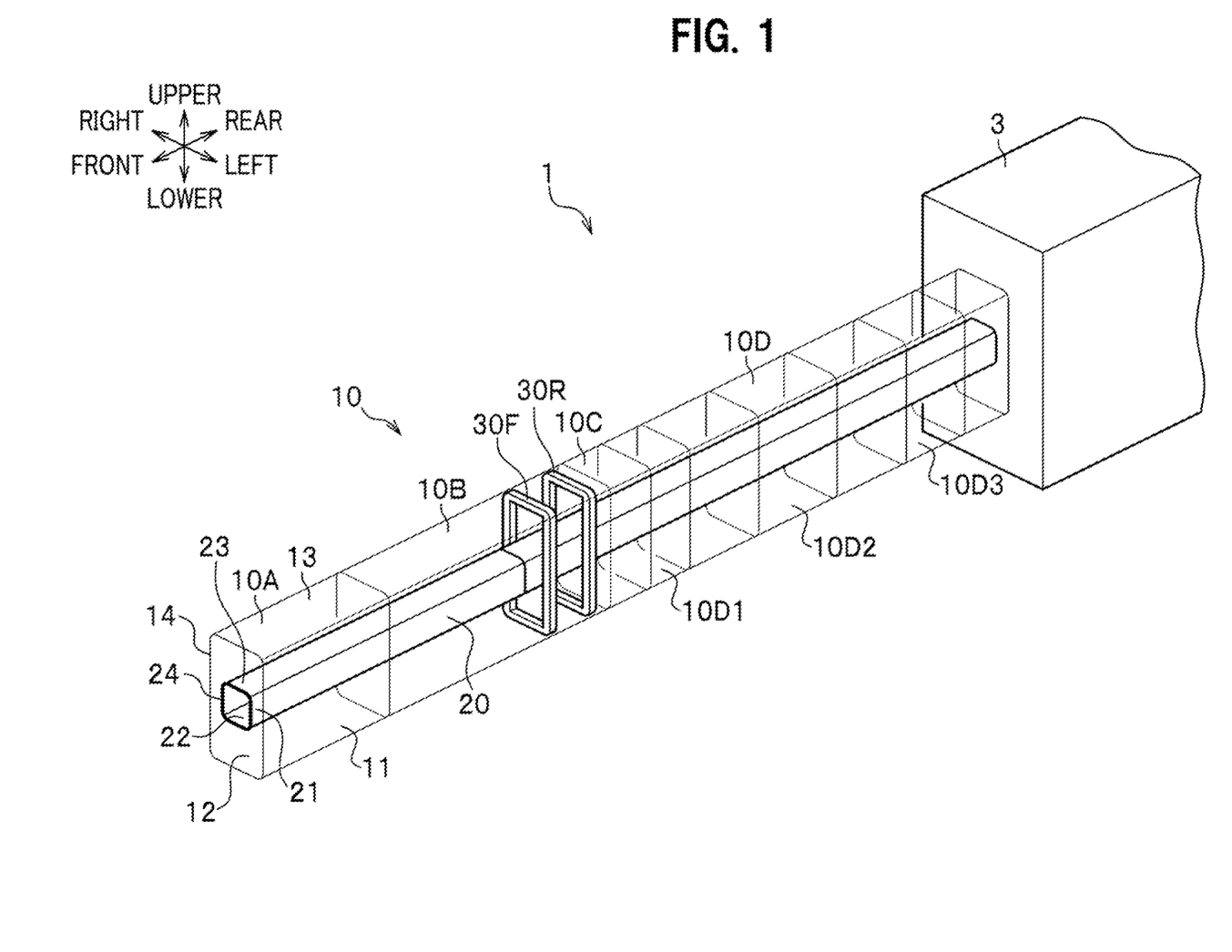
FIG. 1 is a perspective view schematically showing a vehicle body front structure according to one embodiment of the present invention, in which figure an outer surface of a side frame is shown transparent to illustrate an inner structure of the vehicle body front structure.

As seen in FIG. 1, a vehicle body front structure 1 according to one embodiment of the present invention includes a front structural member 2 (see FIG. 2), a rear structural member 3, an engine mount 4 (see FIG. 2), a side frame 10, a tubular member 20, and offset restraint portions 30F, 30R. To sufficiently absorb a load inputted to a vehicle body from a front side of a vehicle, the vehicle body front structure 1 has a dual closed hollow sectional structure consisting of the side frame 10 and the tubular member 20.

Front Structural Member

Figure 2:
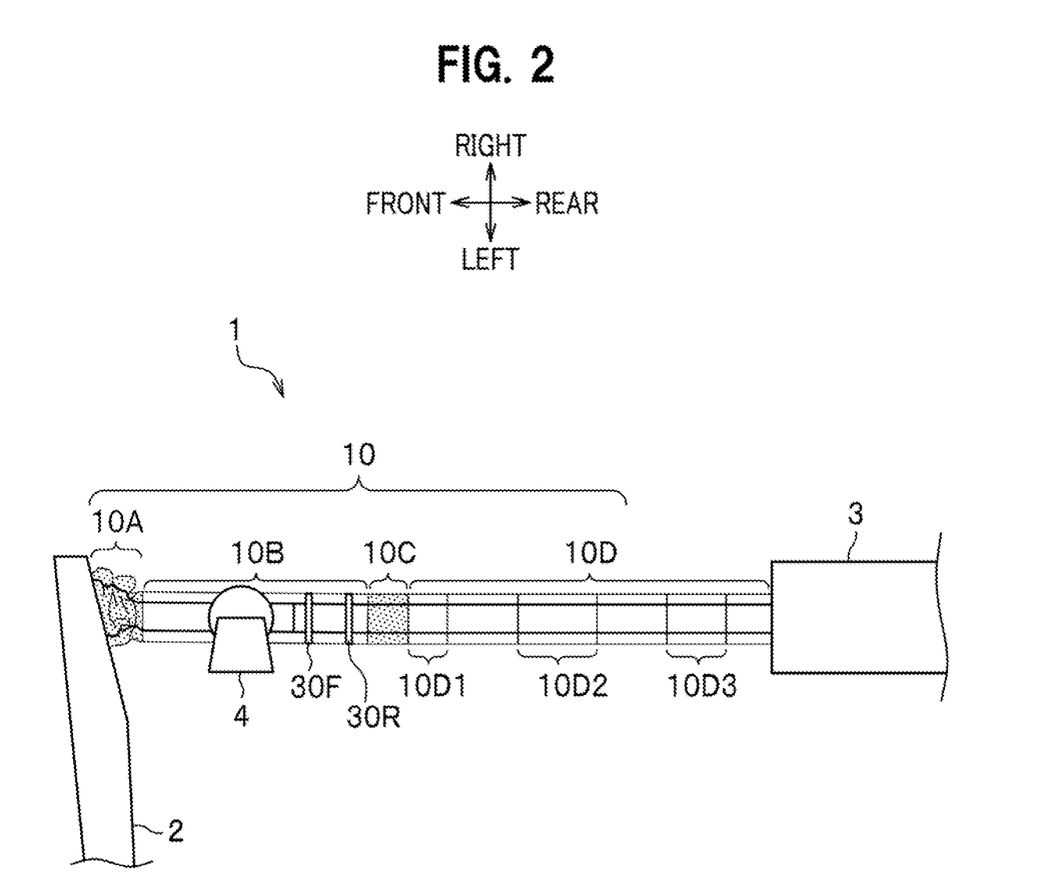
FIG. 2 is a partially transparent top view schematically showing the vehicle body front structure for the purpose of explaining deformation caused by a load applied.

As seen in FIG. 2, the front structural member 2 is a bumper beam of a front bumper that is disposed between front end portions of a pair of right and left side frames 10.

Rear Structural Member

As seen in FIG. 1, the rear structural member 3 is a member connected to a rear end portion of the side frame 10 and configured to constitute a rear portion of the front side frame. The rear structural member 3 as the rear portion of the front side frame extends in a longitudinal direction (i.e., front-rear direction) of the vehicle body while curving downward with the increasing distance from a front portion thereof. Further, a rear end portion of the rear structural member 3 as the front side frame is fixed to a dashboard lower that is configured to divide a power source compartment and a passenger compartment of the vehicle.

Engine Mount

As seen in FIG. 2, an engine mount 4 is fixed to an engine mount fixing portion 10B of each of the right and left side frames 10. In this embodiment, the engine mount 4 is fixed to an upper wall portion 13 of the mount fixing portion 10B, for example, by bolts. An engine as a power source of the vehicle is held on the pair of right and left engine mounts 4. The engine mount 4 serves not only to support the weight of the engine, but to reduce the engine vibration to be transmitted to the side frame 10 and to prevent the engine from shifting by an input from a road surface and other causes. In the case of a three-point support design, the engine is fixed to the vehicle body at the right and left engine mounts 4 and at a rear engine mount. In the case of a four-point support design, the engine is fixed to the vehicle body at the right and left engine mounts 4 and at front and rear engine mounts.

Side Frame

As seen in FIG. 1, the side frame 10 is a tubular structural member disposed frontward of the passenger compartment of the vehicle and extending in the longitudinal direction of the vehicle body. A front end portion of the side frame 10 is fixed to the front structural member 2, for example, by welding or bolts. A rear end portion of the side frame 10 is fixed to the rear structural member 3, for example, by welding. In other words, the front end portion and the rear end portion of the side frame 10 are fixed ends.

The side frame 10 consists of an inner wall portion 11, a lower wall portion 12 extending outward in a vehicle width direction from a lower end portion of the inner wall portion 11, an upper wall portion 13 extending outward in the vehicle width direction from an upper end portion of the inner wall portion 11, and an outer wall portion 14 connecting an outer end portion of the lower wall portion 12 and an outer end portion of the upper wall portion 13 in the vehicle width direction. In a vertical section (i.e., section in a vertical direction (upper-lower direction) orthogonal to the longitudinal direction), the side frame 10 has a closed hollow section in the shape of a vertically oriented rectangular frame. By way of example, the side frame 10 of this design may consist of an inner panel that constitutes the inner wall portion 11, a part of the lower wall portion 12, and a part of the upper wall portion 13, and an outer panel that constitutes the outer wall portion 14, the remaining part of the lower wall portion 12, and the remaining part of the upper wall portion 13; the inner panel and the outer panel are joined together by welding or other suitable means.

The side frame 10 is divided into a plurality of sections in accordance with difference in the manner of deformation upon receiving a load. To be more specific, the side frame 10 includes a crushable portion configured to be crushable at an initial stage of a collision for performing suitable energy absorption, and a breakable portion configured to be breakable at a middle stage of the collision for the purpose of reducing a load to be transmitted rearward and thus suppressing a deformation of the passenger compartment and acceleration to be inputted to an occupant. The side frame 10 includes a first crushable portion 10A, an engine mount fixing portion 10B, a second crushable portion 10C, and a breakable portion 10D, in this order from the front side thereof First Crushable Portion The first crushable portion 10A is a portion including the front end portion of the side frame 10A. The first crushable portion 10A is configured such that the inner wall portion 11, the lower wall portion 12, the upper wall portion 13, and the outer wall portion 14 have the same strength to thereby deform progressively (i.e., crush) in the longitudinal direction without being bent (i.e., buckling or breaking) upward, downward, rightward or leftward when a load from the front side is inputted to the side frame 10 though the front structural member 2; this makes it possible to absorb a part of the load (i.e., energy). Further, the first crushable portion 10A is formed to have an overall strength lower than that of the engine mount fixing portion 10B, so that the first crushable portion 10A becomes crushable.

Engine Mount Fixing Portion

The engine mount fixing portion 10B is a portion located rearward of the first crushable portion 10A. The engine mount 4 is fixed to the engine mount fixing portion 10B, for example, by bolts or through a bracket. The engine mount fixing portion 10B is formed to have an overall strength higher than that of the first crushable portion 10A and that of the second crushable portion 10C to thereby maintain the original shape without a substantial deformation when a load from the front side is inputted to the side frame 10 though the front structural member 2; this makes it possible to continuously hold the engine mount 4.

Second Crushable Portion

The second crushable portion 10C is a portion located rearward of the engine mount fixing portion 10B. The second crushable portion 10C is configured such that the inner wall portion 11, the lower wall portion 12, the upper wall portion 13, and the outer wall portion 14 have the same strength to thereby deform progressively (i.e., crush) in the longitudinal direction without being bent (i.e., buckling or breaking) upward, downward, rightward or leftward when a load from the front side is inputted to the side frame 10 though the front structural member 2; this makes it possible to absorb a part of the load (i.e., energy). Further, the second crushable portion 10C is formed to have an overall strength lower than that of the engine mount fixing portion 10B, so that the second crushable portion 10C becomes crushable.

Breakable Portion

The breakable portion 10D is a portion located rearward of the second crushable portion 10C. The breakable portion 10D includes the rear end portion of the side frame 10. The breakable portion 10D is configured such that the inner wall portion 11 and the outer wall portion 14 are different in strength to thereby deform to break in the vehicle width direction as viewed from above (i.e., breaking deformation) when a load from the front side is inputted to the side frame 10 though the front structural member 2; this makes it possible to absorb a part of the load (i.e., energy) as well as to reduce the load to be transmitted rearward.

Break Points

In this embodiment, the breakable portion 10D includes a first break point 10D1, a second break point 10D2, and a third break point 10D3.

The first break point 10D1 is provided at a front end portion of the breakable portion 10D. The first break point 10D1 is a portion configured such that when a load from the front side is inputted to the side frame 10 though the front structural member 2, the outer wall portion 14 breaks earlier than the inner wall portion 11 and thus the first break point 10D1 is bent inward in the vehicle width direction so as to protrude inward as viewed from above. The first break point 10D1 may be provided, for example, by the outer wall portion 14 that is thinner and lower in strength than the inner wall portion 11.

The second break point 10D2 is provided at a position rearward of and spaced apart from the first break point 10D1. The second break point 10D2 is a portion configured such that when a load from the front side is inputted to the side frame 10 though the front structural member 2, the inner wall portion 11 breaks earlier than the outer wall portion 14 and thus the second break point 10D2 is bent outward in the vehicle width direction so as to protrude outward as viewed from above. The second break point 10D2 may be provided, for example, by the inner wall portion 11 that is thinner and lower in strength than the outer wall portion 14.

The third break point 10D3 is provided at a position rearward of and spaced apart from the second break point 10D2. The third break point 10D3 is a portion configured such that when a load from the front side is inputted to the side frame 10 though the front structural member 2, the outer wall portion 14 breaks earlier than the inner wall portion 11 and thus the third break point 10D3 is bent inward in the vehicle width direction so as to protrude inward as viewed from above. The third break point 10D3 may be provided, for example, by the outer wall portion 14 that is thinner and lower in strength than the inner wall portion 11.

It should be noted that each of the break points 10D1, 10D2, 10D3 is not limited to have a specific configuration, in which one of the inner wall portion 11 and the outer wall portion 14 is thinner than the other so that the thinner wall portion breaks earlier than the thicker wall portion. By way of example, one of the inner wall portion 11 and the outer wall portion 14 may have a ridge line (breaking line) or a bead extending in the vertical direction.

The side frame 10 may consist of separate tubular members including the first crushable portion 10A, the engine mount fixing portion 10B, the second crushable portion 10C, and the breakable portion 10D, which are joined together by welding or other suitable means. Likewise, the breakable portion 10D may consist of separate tubular members including the break points 10D1, 10D2, 10D3 and other portions, which are joined together by welding or other suitable means.

Tubular Member

The tubular member 20 is a member having a tubular configuration and extending in the longitudinal direction within the side frame 10. A rear end portion of the tubular member 20 is fixed to the rear structural member 3, for example, by welding. Further, a front end portion of the tubular member 20 is disposed within the first crushable portion 10A. The front end portion of the tubular member 20 is not fixed to the front structural member 2. In other words, the front end portion of the tubular member 20 is merely in contact with the front structural member 2 or is spaced apart from the front structural member 2. Accordingly, the rear end portion of the tubular member 20 is a fixed end, and the front end portion of the tubular member 20 is a free end. The tubular member 20 is spaced apart from the side frame 10, and is fixed to the rear structural member 3 only to thereby provide a cantilevered structure.

The tubular member 20 consists of an inner wall portion 21, a lower wall portion 22 extending outward in the vehicle width direction from a lower end portion of the inner wall portion 21, an upper wall portion 23 extending outward in the vehicle width direction from an upper end portion of the inner wall portion 21, and an outer wall portion 24 connecting an outer end portion of the lower wall portion 22 and an outer end portion of the upper wall portion 23 in the vehicle width direction. In a vertical section (i.e., section in a vertical direction (upper-lower direction) orthogonal to the longitudinal direction), the tubular member 20 has a closed hollow section in the shape of a square frame. The tubular member 20 is configured such that the inner wall portion 21, the lower wall portion 22, the upper wall portion 23, and the outer wall portion 24 have the same strength and no break point is provided on the tubular member 20. It should be noted that the shape of the tubular member 20 is not limited to the specific shape as described above; for example, the tubular member 20 may have a circular closed hollow section in the vertical direction.

The dimension of the inner wall portion 21 and the outer wall portion 24 of the tubular member 20 in the vertical direction is smaller than that of the inner wall portion 11 and the outer wall portion 14 of the side frame 10 in the vertical direction. The dimension of the lower wall portion 22 and the upper wall portion 23 of the tubular member 20 in the vehicle width direction is smaller than that of the lower wall portion 12 and the upper wall portion 13 of the side frame 10 in the vehicle width direction. The tubular member 20 is disposed spaced apart from the side frame 10. In other words, the tubular member 20, together with the side frame 10, provides a dual closed hollow sectional structure.

The tubular member 20 is configured such that when a load from the front side is inputted to the side frame 10 though the front structural member 2, the tubular member 20 deforms progressively (i.e., crushes) in the longitudinal direction to thereby absorb a part of the load. In this embodiment, the tubular member 20 is designed to have a predetermined difference in strength between front and rear portions thereof (i.e., lower strength at the front portion and higher strength at the rear portion); this makes it possible to initiate crushing from the front end portion side by a load from the front side.

Offset Restraint Portion

A pair of front and rear offset restraint portions 30F, 30R are members attached to an inner surface of the engine mount fixing portion 10B; each of the offset restraint portions 30F, 30R has a vertically oriented rectangular frame shape as viewed from the front side. The offset restraint portions 30F, 30R are disposed spaced apart from the tubular member 20 with a gap in the vehicle width direction from the tubular member 20 being set smaller than that between the tubular member 20 and the side frame 10 so as to prevent the tubular member 20 from shifting (offsetting) relative to the engine mount fixing portion 10B (especially, displacement of the position in the vehicle width direction) when a load from the front side is inputted. The offset restraint portions 30F, 30R may be disposed spaced apart from the tubular member 20 with a gap in the vertical direction from the tubular member 20 being set smaller than that between the tubular member 20 and the side frame 10 so as to prevent the tubular member 20 from shifting (offsetting) relative to the engine mount fixing portion 10B (especially, displacement of the position in the vertical direction) when a load from the front side is inputted. Further, the offset restraint portions 30F, 30R may be configured to prevent a displacement of the position in the vehicle width direction as well as a displacement of the position in the vertical direction.

Relations of the side frame 10 and the tubular member 20 with respect to the structural members 2, 3 and the like will be described below. The rear end portion of the side frame 10 is fixed to the rear structural member 3, and the front end portion of the side frame 10 is fixed to the front structural member 2. The engine mount 4 is fixed to the engine mount fixing portion 10B that is a middle portion of the side frame 10 in the longitudinal direction. Accordingly, the front end portion and the rear end portion of the side frame 10 are fixed ends, and the engine mount 4 is fixed to the middle portion of the side frame 10. The engine mount fixing portions 10B of the pair of right and left side frames 10 are connected together through the engine mounts 4 and an engine, so that the distance between the engine mount fixing portions 10B in the vehicle width direction can be retained.

On the other hand, the rear end portion of the tubular member 20 is fixed to the rear structural member 3, while the front end portion of the tubular member 20 is not fixed to the front structural member 2. However, the front end portion of the tubular member 20 may be in contact with the front structural member 2. The tubular member 20 is not fixed to the side frame 10. To be more specific, the tubular member 20 is spaced apart from the first crushable portion 10A, the second crushable portion 10C, and the breakable portion 10D of the side frame 10; the tubular member 20 may be spaced apart from the engine mount fixing portion 10B or in contact with the engine mount fixing portion 10B through the offset restraint portions 30F, 30R. According to the configuration in which the tubular member 20 is in contact with the engine mount fixing portion 10B through the offset restraint portions 30F, 30R, the tubular member 20 is slidable in the longitudinal direction relative to the engine mount fixing portion 10B through the offset restraint portions 30F, 30R. Accordingly, the tubular member 20 provides a cantilevered structure in which only the rear end portion thereof is a fixed end, while the front end portion thereof is a free end and the middle portion thereof is not fixed to the side frame 10.

Deformation by Frontal Collision Load

With reference to FIGS. 1 to 6, a deformation of the vehicle body front structure 1 according to this embodiment caused by a frontal collision load will be described below.

When a load from the front side is inputted to the front structural member 2, the front structural member 2 deforms to transmit the load to the side frame 10.

As seen in FIG. 2, when the load is transmitted to the side frame 10, the first crushable portion 10A crushes by the load, and after the front side structural member 2 comes into contact with the tubular member 20, the tubular member 20 crushes by the load.

Figure 3:
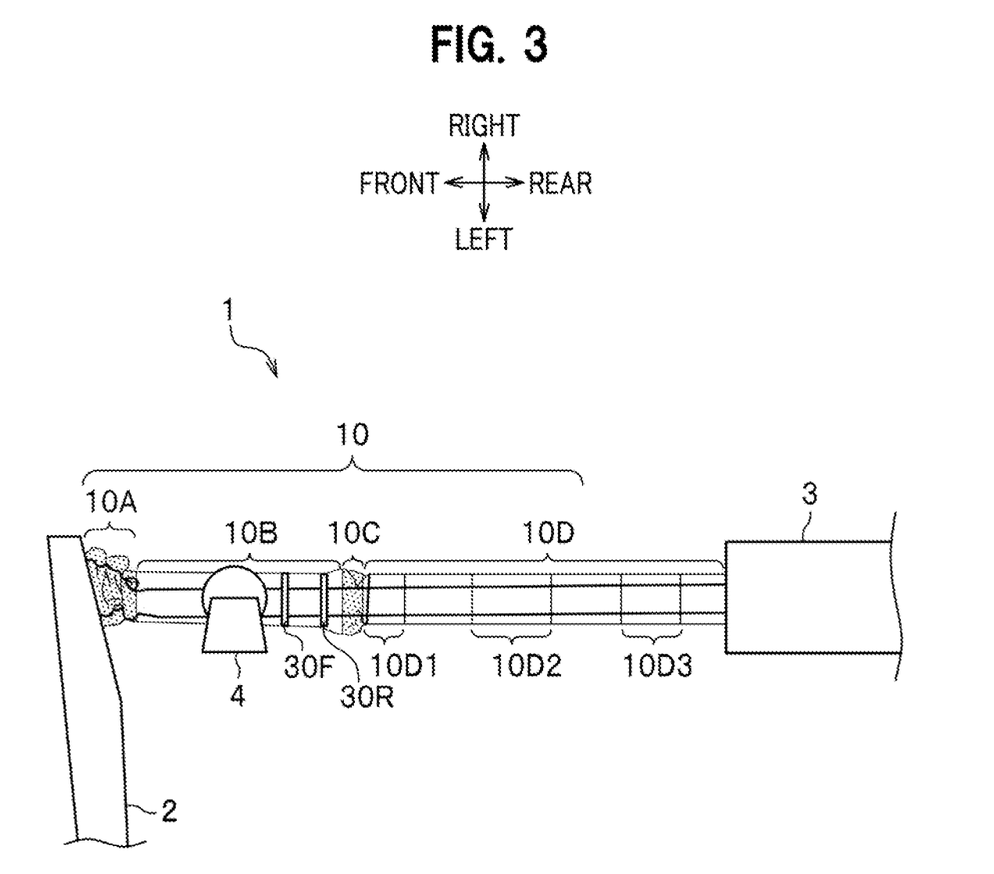
FIG. 3 is a partially transparent top view schematically showing the vehicle body front structure for the purpose of explaining deformation caused by a load applied.

Next, as seen in FIG. 3, the second crushable portion 10C crushes by the load and the tubular member 20 also crushes by the load. When the second crushable portion 10C crushes, the front end portion of the side frame 10 may possibly be directed to another direction, so that the front end portion of the side frame 10 and the front end portion of the tubular member 20 may contact each other to interfere crushing of the tubular member 20. However, the vehicle body front structure 1 includes a pair of front and rear offset restraint portions 30F, 30R, which can suppress interference of the crushing because the front end portion side of the side frame 10 and the front end portion side of the tubular member 20 are brought into contact; therefore, the tubular member 20 can crush appropriately.

Figure 4:
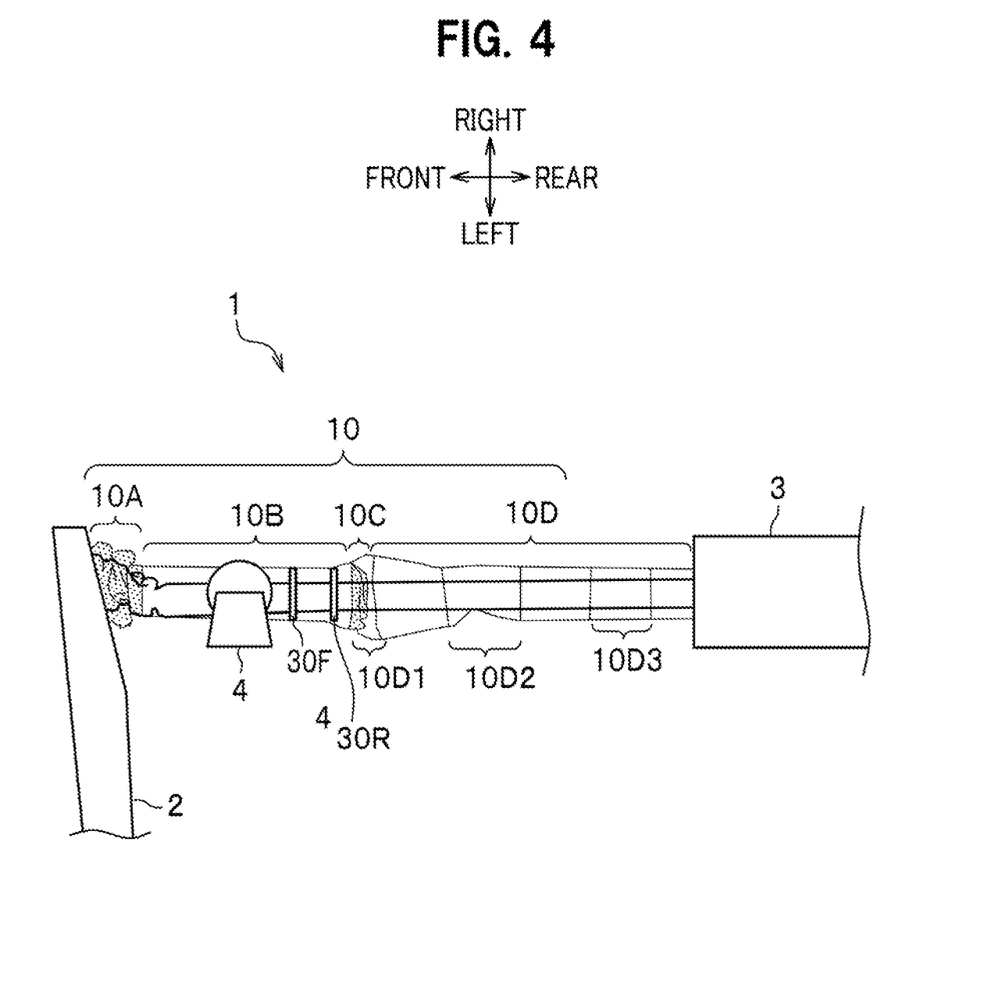
FIG. 4 is a partially transparent top view schematically showing the vehicle body front structure for the purpose of explaining deformation caused by a load applied.
Figure 5:
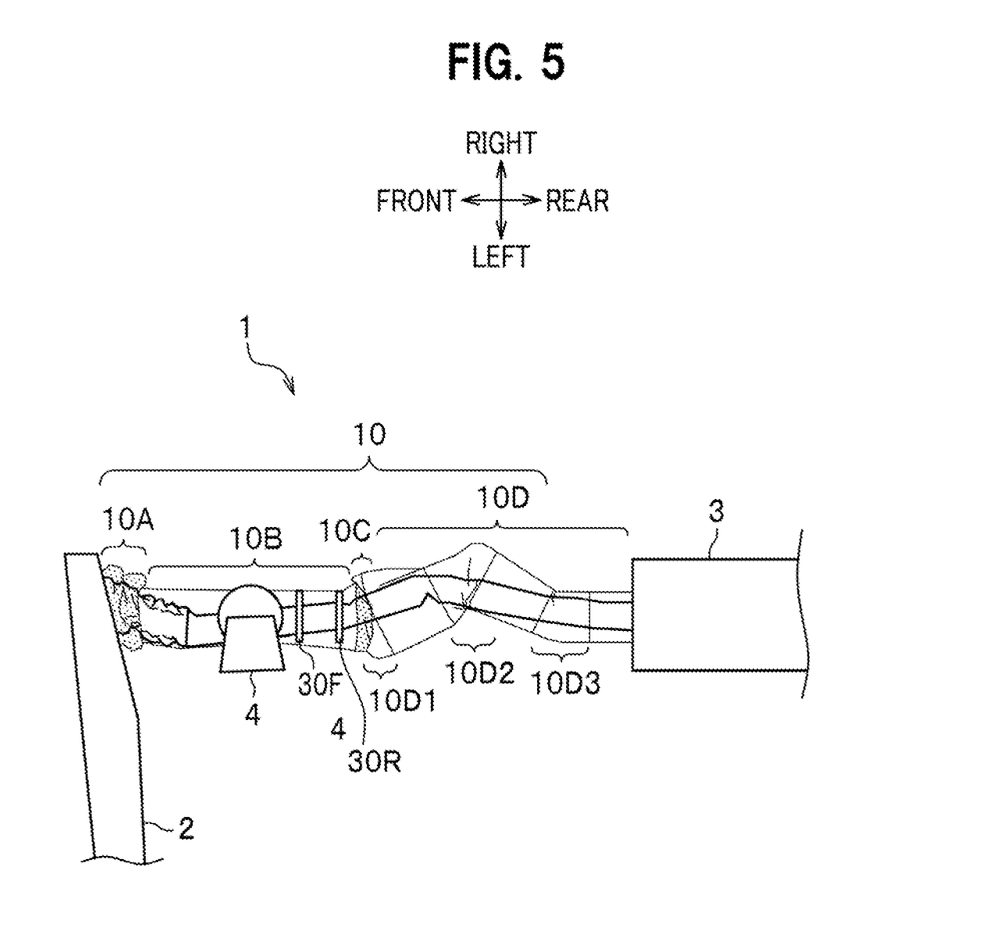
FIG. 5 is a partially transparent top view schematically showing the vehicle body front structure for the purpose of explaining deformation caused by a load applied.

Next, as seen in FIG. 4, the breakable portion 10D breaks progressively from the front side first break point 10D1, while the tubular member 20 crushes by the load. As seen in FIG. 5, the breakable portion 10D having broken accordingly comes into contact with the tubular member 20, so that the breaking deformation of the breakable portion 10D delays (i.e., progresses slowly) by the tubular member 20. The tubular member 20 then breaks by the load, due to the breaking deformation of the breakable portion 10D. As described above, even if the breakable portion 10D initiates the breaking deformation, crushing of the tubular member 20 has been continuing; this can reduce the peak value of the load applied at an instant immediately before the breaking deformation (from P1 to P2). Further, as the result of the delayed progress of the breaking deformation of the breakable portion 10D by the tubular member 20, and due to the breaking deformation of the tubular member 20, the average load after the peak value P2 can be improved.

Figure 6:
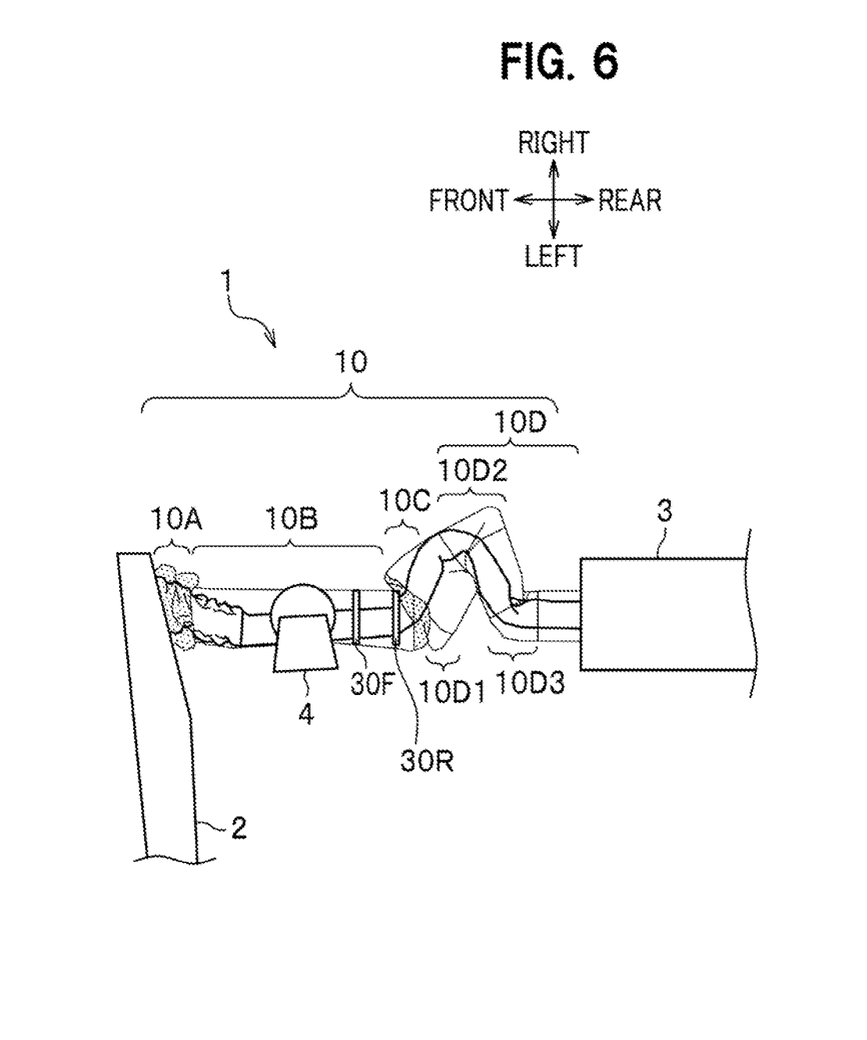
FIG. 6 is a partially transparent top view schematically showing the vehicle body front structure for the purpose of explaining deformation caused by a load applied.

Next, as seen in FIG. 6, the breakable portion 10D having broken at the first break point 10D1, the second break point 10D2, and the third break point 10D3 crushes completely by the load.

Figure 7:
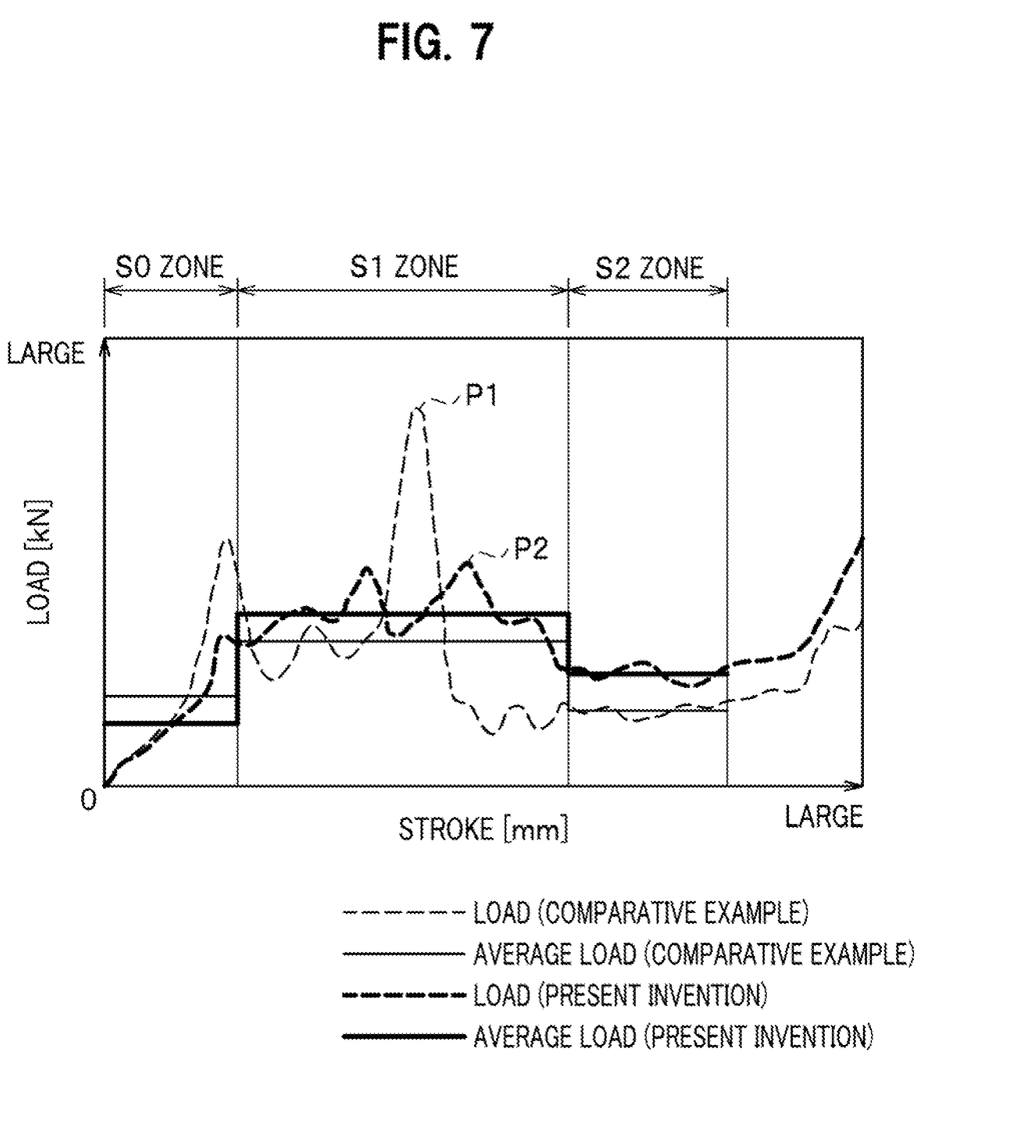
FIG. 7 is a graph showing one example of relationships between load and stroke during a frontal collision, in which graph a relationship of the vehicle body front structure according to the present invention and a relationship of a vehicle body front structure according to a comparative example are plotted.

With reference to FIG. 7, relationships between stroke and load during a frontal collision will be described below, in which graph a relationship of the vehicle body front structure according to the present invention and a relationship of a vehicle body front structure according to a comparative example are plotted. It should be noted that in the vehicle body front structure according to the comparative example, the tubular member 20 and the offset restraint portions 30F, 30R are not provided in the above-described vehicle body front structure 1 and the second crushable portion 10C is not provided in the side frame 10. Further, the total weight of the side frame 10, the tubular member 20, and the offset restraint portions 30F, 30R of the vehicle body front structure 1 is substantially the same as the weight of the side frame according to the comparative example.

In FIG. 7, S0 zone is a zone, in which a part of a load is absorbed by the front structural member 2. As described previously with reference to FIGS. 2-5, S1 zone is a zone, in which a part of the load is absorbed by the side frame 10 (and by the tubular member 20). As described previously with reference to FIG. 6, S2 zone is a zone, in which the absorption of the load by the side frame 10 (and by the tubular member 20) has been completed.

As seen in FIG. 7, the vehicle body front structure 1 improves the average load (i.e., the amount of energy absorption) at the S1 zone because crush of the tubular member 20 is further added as compared with the comparative example. In other words, the vehicle body front structure 1 can improve the weight efficiency in energy absorption. Further, the vehicle body front structure 1 can lower the peak value of the load at the S1 zone because a breaking deformation of the tubular member 20 is further added as compared with the comparative example. To be more specific, the vehicle body front structure 1 slows down the progress of the breaking deformation at the breakable portion 10D by the provision of the tubular member 20, and the crushing of the tubular member 20 continues during the delay of the breaking deformation, thereby reducing the peak value of the load applied at the instant immediately before the breaking deformation (from P1 to P2). In other words, the vehicle body front structure 1 can reduce impact occurred to an occupant during a frontal collision.

The vehicle body front structure 1 according to this embodiment comprises: the side frame 10 extending in the longitudinal direction of the vehicle body and configured to have a closed hollow section in the vertical direction; and the tubular member 20 extending in the longitudinal direction within the side frame 10 and configured to have a closed hollow section in the vertical direction, wherein the tubular member 20 is spaced apart from the side frame 10.

With this configuration, the vehicle body front structure 1 can improve the degree of flexibility in designing energy absorption performance during a frontal collision; this is because the side frame 10 and the tubular member 20 absorb energy independently or in cooperation with each other after at least one of the side frame 10 and the tubular member 20 breaks and the side frame 10 and the tubular member 20 are brought into contact.

Further, in the vehicle body front structure 1, the side frame 10 includes: the first crushable portion 10A located at a front side portion of the side frame 10 and configured to be crushable by a load applied from the front side; the breakable portion 10D located at a rear side portion of the side frame 10 and configured to be breakable by a load applied from the front side; and the engine mount fixing portion 10B located between the first crushable portion 10A and the breakable portion 10D, and to which the engine mount 4 is fixed, wherein the tubular member 20 is crushable by a load applied from the front side.

With this configuration of the vehicle body front structure 1, crushing of the side frame 10 can absorb energy at an initial stage of the collision, and a breaking deformation of the side frame 10 can reduce the load to be transmitted rearward at a middle stage of the collision, while crushing of the tubular member 20 can sufficiently absorb energy.

Further, in the vehicle body front structure 1, the front end portion of the tubular member 2 is disposed within the first crushable portion 10A.

With this configuration, the vehicle body front structure 1 initiates crushing of the tubular member 20 at a desired timing in accordance with crushing of the side frame 10.

Further, in the vehicle body front structure 1, the side frame 10 includes the second crushable portion 10C located between the engine mount fixing portion 10B and the breakable portion 10D and configured to be crushable by a load applied from the front side.

With this configuration, since the vehicle body front structure 1 includes the crushable portions 10A, 10C at positions frontward and rearward of the engine mount fixing portion 10B, the time for absorbing energy and the amount of energy absorption at an initial stage of the collision can be increased.

Further, the vehicle body front structure 1 further includes the offset restraint portions 30F, 30R provided within the engine mount fixing portion 10B, the offset restraint portions 30F, 30R being configured to prevent the tubular member 20 from offsetting relative to the engine mount fixing portion 10B when the tubular member 20 receives a load from the front side.

With this configuration of the vehicle body front structure 1, the tubular member 20 can crush appropriately even after the crushing of the second crushable portion 10C.

Further, in the vehicle body front structure 1, the rear end portion of the side frame 10 and the rear end portion of the tubular member 20 are fixed to the rear structural member 3, and the front end portion of the side frame 10 is fixed to the front structural member 2, while the front end portion of the tubular member is not fixed to the front structural member 2.

With this configuration of the vehicle body front structure 1, the tubular member 20 can crush appropriately without an influence of a deformation of the front structural member 2.

Although one preferred embodiment of the present invention has been described above, the present invention is not limited to the above-described embodiment and various changes and modifications may be made where necessary without departing from the gist of the present invention. For example, the offset restraint portions are not limited to the above-described two offset restraint portions each having a rectangular frame shape. As an alternative, each offset restraint portion may be a rod-like member attached to at least one of the inner wall portion 11 and the outer wall portion 14, or a recess portion integrally formed in at least one of the inner wall portion 11 and the outer wall portion 14. Further, the offset restraint portions may be provided on the tubular member 20.

In the above-described embodiment, the present invention is applied to an automobile equipped with an engine. However, the present invention is applicable to other types of vehicles such as a motor vehicle and a hybrid vehicle. In the above-described embodiment, the engine mount fixing portion 10B as an example of a mount fixing portion is located between the first crushable portion 10A and the breakable portion 10D, and the engine mount 4 as an example of a mount is fixed to the engine mount fixing portion 10B. As an alternative embodiment, the vehicle body front structure according to the present invention may include a motor mount fixing portion to which a motor mount is fixed.

The invention claimed is:

1. A vehicle body front structure comprising:
   a side frame extending in a longitudinal direction of a vehicle body and configured to have a closed hollow section in a vertical direction orthogonal to the longitudinal direction; and
   a tubular member extending in the longitudinal direction within the side frame and configured to have a closed hollow section in the vertical direction,
   wherein the tubular member is spaced apart from the side frame.

2. The vehicle body front structure according to claim 1, wherein the side frame includes:
   a first crushable portion located at a front side portion of the side frame and configured to be crushable by a load applied from the front side;
   a breakable portion located at a rear side portion of the side frame and configured to be breakable by a load applied from the front side; and
   a mount fixing portion located between the first crushable portion and the breakable portion, and to which a mount is fixed,
   wherein the tubular member is crushable by a load applied from the front side.

3. The vehicle body front structure according to claim 2, wherein a front end portion of the tubular member is disposed within the first crushable portion.

4. The vehicle body front structure according to claim 2, wherein the side frame includes a second crushable portion located between the mount fixing portion and the breakable portion and configured to be crushable by a load applied from the front side.

5. The vehicle body front structure according to claim 4, further comprising an offset restraint portion provided within the mount fixing portion, the offset restraint portion being configured to prevent the tubular member from offsetting relative to the mount fixing portion when the tubular member receives a load from the front side.

6. The vehicle body front structure according to claim 2, wherein the mount fixing portion is an engine mount fixing portion to which an engine mount is fixed.

7. The vehicle body front structure according to claim 2, wherein the mount fixing portion is a motor mount fixing portion to which a motor mount is fixed.

8. The vehicle body front structure according to claim 1, wherein a rear end portion of the side frame and a rear end portion of the tubular member are fixed to a rear structural member, and
   wherein a front end portion of the side frame is fixed to a front structural member, while a front end portion of the tubular member is not fixed to the front structural member.

* * * * *